United States Patent [19]

Bier et al.

[11] Patent Number: 4,942,194

[45] Date of Patent: Jul. 17, 1990

[54] RAPID-CRYSTALLIZING POLYPHENYLENE SULPHIDE COMPOSITIONS

[75] Inventors: Peter Bier, Pittsburgh, Pa.; Klaus Reinking, Wermelskirchen, Fed. Rep. of Germany; Ludwig Bottenbruch; Erhard Tresper, both of Krefeld, Fed. Rep. of Germany

[73] Assignee: Bayer Aktiengesellschaft, Leverkusen, Fed. Rep. of Germany

[21] Appl. No.: 19,016

[22] Filed: Feb. 26, 1987

[30] Foreign Application Priority Data

Mar. 8, 1986 [DE] Fed. Rep. of Germany ....... 3607712

[51] Int. Cl.$^5$ .......................... C08K 5/10; C08K 5/11; C08K 5/12
[52] U.S. Cl. .................................. 524/281; 524/280; 524/293; 524/294; 524/296; 524/297; 524/306; 524/315; 524/318
[58] Field of Search .................... 264/331.11; 525/537; 528/388; 428/419; 524/292, 293, 296, 297, 306, 317, 315, 318, 294, 280, 281

[56] References Cited

U.S. PATENT DOCUMENTS

| 4,395,509 | 7/1983 | Blackwell et al. | 524/318 |
| 4,405,740 | 9/1983 | Davies | 524/293 |
| 4,507,468 | 3/1985 | Kawabata et al. | 528/388 |
| 4,548,977 | 10/1985 | South | 524/609 |
| 4,631,336 | 12/1986 | Idel et al. | 528/388 |

FOREIGN PATENT DOCUMENTS

| 0103279 | 3/1984 | European Pat. Off. | |
| 59-8756A | 1/1984 | Japan | 524/609 |

OTHER PUBLICATIONS

Van Nostrand Reinhold Co., "The Condensed Chemical Dictionary"–10th edition (1981) p. 196.
Hackh's Chemical Dictionary–McGraw Hill–Book Co. (1969) p. 347.
Patent Abstracts of Japan, vol. 9, No. 59 (C–270) (1782), Mar. 15, 1985.
Patent Abstracts of Japan, vol. 7, No. 167 (C–177) (1312), Jul. 22, 1983.

*Primary Examiner*—Veronica P. Hoke
*Attorney, Agent, or Firm*—Connolly & Hutz

[57] ABSTRACT

The invention relates to highly crystalline, rapid-crystallizing, thermoplastic compositions of polyphenylene sulphides and carboxylic acid esters.

2 Claims, No Drawings

RAPID-CRYSTALLIZING POLYPHENYLENE SULPHIDE COMPOSITIONS

The invention relates to highly crystalline, rapid-crystallizing, thermoplastic compositions of polyphenylene sulphides and carboxylic acid esters.

Polyphenylene sulphides can be used as raw materials for preparing fibres, sheets and shaped articles. Owing to their partly crystalline structure, they have excellent properties, for example high wear resistance, favourable creep resistance properties and high dimensional accuracy. They are therefore highly suitable for the production of mechanically and thermally highly stressed parts.

An additional improvement in the mechanical properties can be obtained by incorporating reinforcing materials, for example glass fibres.

However, the production of shaped articles from polyphenylene sulphide by injection moulding is problematical since high mould temperatures (>130° C.) and relatively long moulding times are necessary. Most injection moulding processors cannot use mould temperatures of >130° C. and more since the moulds are normally designed for a temperature of around 100° C. (heating agent water). Mould installations which are operated with other heating agents, for example oil, and attain temperatures of >110° C. are generally rare, and their use poses problems. Very frequently even they in practice do not attain the desired temperatures, and the temperature distribution is uneven. Owing to these disadvantages, it can be economically unrecommendable to use such high mould temperatures in the injection moulding sector.

Furthermore, it is desirable to attain high crystallinity as rapidly as possible in order to obtain optimum properties. High crystallinity ensures hardness, dimensional stability, and shape stability, even at relatively high temperatures. Also dependent on the mould residence time is the length of the injection cycle with codetermines the economics.

These cycles are relatively long even at the high mould temperatures for the processing of polyphenylene sulphide and hinder the advance of polyphenylene sulphide in the production of injection mouldings.

It has now been found that polyphenylene sulphides have higher crystallinity and crystallize more rapidly when they contain 0.5–30% by weight, relative to polyphenylene sulphide, of monomeric carboxylic acid esters. This allows the degree of crystallinity required for high shape stability to be reached more rapidly and the polyphenylene sulphide compositions thus to be processed in much shorter injection cycles.

A further advantage of the polyphenylene sulphide compositions according to the invention consists in the reduction of the mould temperature without the advantageous crystallization properties being unpaired. The injection moulding composition cools down more rapidly, thus further reducing the mould residence time.

The invention relates to highly crystalline, rapid-crystallizing thermoplastic compositions consisting of:
(a) 70–99.5, preferably 90–98.5, particularly preferably 93–97, % by weight of a polyphenylene sulphide having a melt viscosity of at least 5 Pas, preferably of at least 50 Pas to 1200 Pas (measured at 306° C. under a shearing stress of $10^3$ Pa) and
(b) 0.5–30, preferably 1.5–10, particularly preferably 3–7, % by weight, relative to (a) and (b) of a monomeric carboxylic acid ester.

Representative compounds which are used as monomeric carboxylic acid esters (in the context of the specification and claims the term "carboxylic acid esters" is to be understood as including the carbonic acid esters of formula II) have the following formulae (I) or (II):

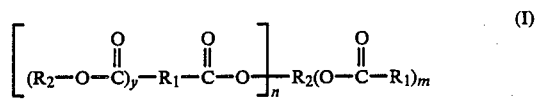

in which
$R_1$ represents identical or different radicals of a linear or branched $C_1$–$C_{25}$-aliphatic, cycloaliphatic, $C_{10}$–$C_{24}$-aromatic or $C_7$–$C_{24}$-araliphatic carboxylic acid,
$R_2$ represents identical or different radicals of a linear or branched aliphatic, cycloaliphatic, araliphatic or aromatic alcohol having 1 to 20, preferably 5 to 15, carbon atoms,
m represents the number 0, 1, 2, 3, or 4,
n represents the number 1 when m represents the number 0, and represents the number 0 when m represents the number 1, 2, 3 or 4, and
y represents the number 1, 2 or 3.
$R_1$ and $R_2$ preferably represent $C_1$–$C_8$-alkyl radicals. They can have substituents which substantially do not react with the polyphenylene sulphide under injection moulding conditions, for example $C_1$–$C_4$-alkyl groups, $NO_2$ groups, etc.

Other examples of monomeric carboxylic acid esters are: dioctyl adipate, dinonyl phthalate, neopentylglycol dibenzoate.

The present invention further relates to a process for preparing highly crystalline, rapid-crystallizing, thermoplastic compositions, which is characterized in that 70–99.5, preferably 90–98.5, particularly preferably 93–97, % by weight of a polyphenylene sulphide having a melt viscosity of at least 5 Pas, preferably of at least 50 Pas to 1200 Pas (306° C., $10^3$ Pa) and 0.5 –30, preferably 1.5–10, particularly preferably 3 to 7, % by weight of a monomeric carboxylic acid ester are mixed by adding the carboxylic acid ester to the polyphenylene sulphide melt and homogenizing the mixture in the melt.

The invention furthermore related to a process for injection moulding these thermoplastic compositions obtainable according to the invention, which process is characterized in that a mixture of a polyphenylene sulphide having a melt viscosity of at least 5 Pas, preferably of at least 50 Pas to 1200 Pas (measured at 306° C. under a shearing stress of $10^3$ Pa) and a carboxylic acid ester are cast into moulds which have a temperature of no more than 120° C., the amount of carboxylic acid ester being chosen in such a way that the injection-moulded polyphenylene sulphide has at least 70% of the crystallinity which is obtained when injection moulding a moulding from unmodified polyphenylene sulphide at mould temperatures of at least 130° C.

Polyarylene sulphides can be prepared in a known manner from dihalogenorarmatics and alkali metal sulphides in solution (for example U.S. Pat. No. 2,513,188).

The monomeric carboxylic acid esters can be prepared by esterifying or reacting carboxylic acids, their anhydrides, acid chlorides and/or the corresponding dialkyl derivatives with aliphatic, cycloaliphatic, araliphatic or aromatic alcohols.

A detailed description of the different methods of preparation is given for example by H. Henecka et al in Houben-Weyl, vol VIII, page 359–680 (1952); by E. Müller in Houben-Weyl (1963), 1 et seq.; Georg Thieme Verlag, Stuttgart 1963; and in V. V. Korshak and S. V. Vinogradova, "Polyesters", Pergamon Press, Oxford 1965, pages 34–63.

Preferred monomeric carboxylic acid esters are those which are those which are derived from carboxylic acids such as adipic acid, azelaic acid, sebacic acid, 2-ethylhexanoic acid, lauric acid, stearic acid, phthalic acid, trimellitic acid, benzoic acid and alcohols such as ethylene glycol, propanediol, butanediol, hexanediol, di-/tri-/tetra-/oligoethylene glycols, neopentylglycol, pentaerythritol, 2-ethylhexanol, octanol, nonylalcohol, decyl alcohol, butanol, octybenzyl alcohol, butylbenzyl alcohol and stearyl alcohol.

The preparation of the mixture of polyphenylene sulphides and carboxylic acid esters can be carried out on commercially customary mixing apparatuses. Suitable such apparatuses are kneaders and single-screw and twin-screw extruders. For further processing, the mixture obtained can be granulated after the melt has solidified.

The polyphenylene sulphide compositions can additionally contain fillers and/or reinforcing materials in the form of powders, fibres or mats. Examples thereof are metals such as steel, copper, aluminium or carbon. Preferred fillers are quartz, talcum or kaolin, preferred reinforcing materials are glass fibres. Preferred amounts of fillers, relative to the total compound, are between 5 and 60% by volume.

The compositions can optionally further contain inorganic pigments, such as, for example $TiO_2$, ZnS, phthalocyanines, carbon blacks, Cd pigments, spinels or organic dyestuffs, flow aids, mould release agents such as, for example, hydrocarbon waxes, ester waxes, amide waxes, UV-absorbers and/or stabilizers.

To further increase the flame resistance of the products, they can additionally contain customary flame-retarding additives such as, for example, those which contain halogen, phosphorus, phosphorus nitride, optionally in combination with oxides of the elements of subgroup V such as, for example, antimony oxide.

The rate of crystallization of the polyphenylene sulphide compositions can be further increased by adding inorganic or organic nucleating agents. This is carried out as a matter of course with injection moulding compositions. The amounts are 0.05 to 5, preferably 0.1 to 1% by weight. The preferred nucleating agent is microtalcum.

The polyphenylene sulphide compositions according to the invention are excellent starting materials for preparing sheets and fibres, preferably for preparing shaped articles of any kind by injection moulding.

EXAMPLES

The polyphenylene sulphide compositions according to the invention were prepared by mixing and homogenizing the base components (see Table 1) with a 30 mm Werner and Pfleiderer twin-screw extruder at a melt temperature of 310° C. The extrudates, chopped into granules, were dried overnight.

The isothermal rate of crystallization of the dried granules was measured by means of TLC apparatus. Pretreatment of the samples: heated to 330° C., maintained at this temperature for 1 min and quenched in liquid nitrogen. The amorphous samples were allowed to crystallize out isothermally at 110° C. in the TLC apparatus, the change in the heat of crystallization being recorded as a function of time (exothermic peak).

As a measure of the rate of crystallization, the time required to reach the maximum is recorded in Table 1 as a half-value time.

The samples 1–8 according to the invention listed in Table 1 consist of a polyphenylene sulphide having a melt viscosity of 90 Pas (measured up to 306° C. and a shearing stress of 1000 Pa), 3.5% by weight of a monomeric carboxylic acid ester, 40% by weight of glass fibres and 5% by weight of microtalcum. Example 9 is a corresponding polyphenylene sulphide sample without carboxylic acid, for comparison.

TABLE 1

| Example | Carboxylic acid ester | Isothermal (110° C.) rate of crystallization half-value time [s] |
|---|---|---|
| 1 | Di-2-ethylhexyl adipate | 12 |
| 2 | Di-isononyl adipate | 12 |
| 3 | Di-butyl adipate | 12 |
| 4 | Benzyl butyl phthalate | 24 |
| 5 | Di-octyl sebacate | 26 |
| 6 | Di-Butyl laurate | 26 |
| 7 | Tri-(n-octyl/n-decyl) trimellitate | 28 |
| 8 | Tetra(pentaerythritol) stearate | 32 |
| 9 | — | 42 |

We claim:

1. A process for preparing an injection molded product prepared from highly crystalline, rapid-crystallizing, thermoplastic mixture consisting of
   (a) 70–99.5% by weight of a polyphenylene sulphide having a melt viscosity of at least 5 Pas (measured at 306° C. under a shearing stress of $10^3$ Pa) and
   (b) 0.5–30% by weight, relative to (a) and (b), of a monomeric carboxylic acid ester selected from

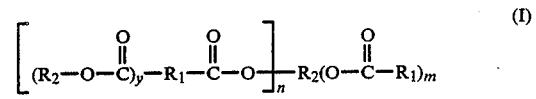

and

where
R₁ represents identical or different radicals of a linear or branched $C_1$–$C_{25}$-aliphatic, cycloaliphatic, $C_{10}$–$C_{24}$-aromatic or $C_7$–$C_{24}$-araliphatic carboxylic acid, R₂ represents identical or different radicals of a linear or branched aliphatic, cycloaliphatic, araliphatic or aromatic alcohol having 1 to 20 carbon atoms, m represents the number 0, 1, 2, 3 or 4, n represents the number 1, when m represents the number 0, and represents the number 0, when m represents the number 1, 2, 3 or 4 and y represents the number 1, 2 or 3, by the process comprising first mixing the carboxylic acid ester with the polyphenylene sulphide, when the polyphenylene is in a melt, and homogenizing the mixture in the melt, then casting the homogenized mixture into a mould which has a temperature of no more than 120° C., the amount of carboxylic acid ester being chosen in such a way that the injection-moulded polyphenylene sulphide has at least 70% of the crystallinity which is obtained in injection moulding a moulding from unmodified polyphenylene sulphide at mould temperature of at least 130° C.

2. A process in accordance with claim 1, wherein $R_1$, $R_2$ or both have substituents which substantially do not react with the polyphenylene sulphide under injection molding conditions.

* * * * *